(12) United States Patent
Odlyzko et al.

(10) Patent No.: US 8,611,274 B2
(45) Date of Patent: Dec. 17, 2013

(54) METHOD FOR SCHEDULING TRANSMISSIONS IN COMMUNICATION SYSTEMS

(75) Inventors: Paul Odlyzko, Arlington Heights, IL (US); Michael S. Johnson, Orlando, FL (US); Charles D. Macenski, Buffalo Grove, IL (US)

(73) Assignee: Cambium Networks, Ltd, Devon (GB)

( * ) Notice: Subject to any disclaimer, the term of this patent is extended or adjusted under 35 U.S.C. 154(b) by 360 days.

(21) Appl. No.: 12/797,700

(22) Filed: Jun. 10, 2010

(65) Prior Publication Data

US 2011/0305145 A1     Dec. 15, 2011

(51) Int. Cl.
*H04B 7/212*     (2006.01)
(52) U.S. Cl.
USPC ......................................................... 370/321
(58) Field of Classification Search
USPC ......................................................... 370/321
See application file for complete search history.

(56) References Cited

U.S. PATENT DOCUMENTS

| | | | |
|---|---|---|---|
| 6,967,944 B2 | 11/2005 | Choi | |
| 7,355,992 B2 * | 4/2008 | Jones et al. | 370/315 |
| 2005/0237973 A1 | 10/2005 | Takeda et al. | |
| 2009/0147790 A1 | 6/2009 | Kang et al. | |
| 2010/0322139 A1 | 12/2010 | Choi et al. | |

FOREIGN PATENT DOCUMENTS

KR   10-2008-0090029   10/2008

OTHER PUBLICATIONS

International Search Report issued in related application No. PCT/US2011/035279, dated Nov. 30, 2011, 2 pages.

* cited by examiner

*Primary Examiner* — Chandrahas Patel
(74) *Attorney, Agent, or Firm* — Brinks Gilson & Lione

(57) ABSTRACT

A communication system comprises a communication node for scheduling uplink and downlink transmissions in a communication system. The communication node determines based on a first set of parameters of a data associated with the communication node and a second set of parameters of a data associated with one other communication node, whether to load the data associated with the communication node from an end of a data queue buffer. The communication node upon determining to load the data associated with the communication node from the end of the data queue buffer, loads the data associated with the communication node from the end of the data queue buffer. The communication node further determines a start time for transmission of the data associated with the communication node and schedules transmission of the data associated with the communication node at the start time.

17 Claims, 7 Drawing Sheets

METHOD FOR SCHEDULING TRANSMISSIONS IN COMMUNICATION SYSTEMS

FIELD OF THE DISCLOSURE

The present disclosure relates generally to a communication systems and more particularly to a method for scheduling transmissions in communication systems.

BACKGROUND

In a Time-Division Duplex (TDD) communication system, a single frequency is assigned to a communication node for both transmission and reception purposes. In TDD communication systems, a data stream is divided into frames and each frame is further divided into time slots. Within each frame a different time slot is assigned for transmission and reception purposes. However, the, frequency spectrum is a valuable resource which is divided into non-overlapping spectrum bands and further assigned to different communication nodes. Typically, one or more frequency bands (e.g. spectrum bands) being used by one or more communication nodes are re-used by other distant communication nodes to increase both the coverage and capacity of the communication system. The phenomenon of frequency reuse can result in crosstalk between two different communication nodes using the same frequency. This crosstalk from two different communication nodes using the same frequency is known as co-channel interference. Apart from the co-channel interference, a communication node also experiences interference from other communication nodes that operate on a nearby or adjacent frequency. Interference resulting from other communication nodes that are adjacent in frequency to the communication node is known as adjacent channel interference. Thus, whenever a communication node transmits its data, there is a significant potential for interference due to data transmitted by co-channel or adjacent channel communication nodes. This interference forces can constrain the communication node to transmit at lower data rates consistent with lower signal to interference-noise ratio.

Thus, there exists a need for a scheduling method that schedules the transmission from communication nodes in such a way that the interference between the transmissions from communication nodes is reduced.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
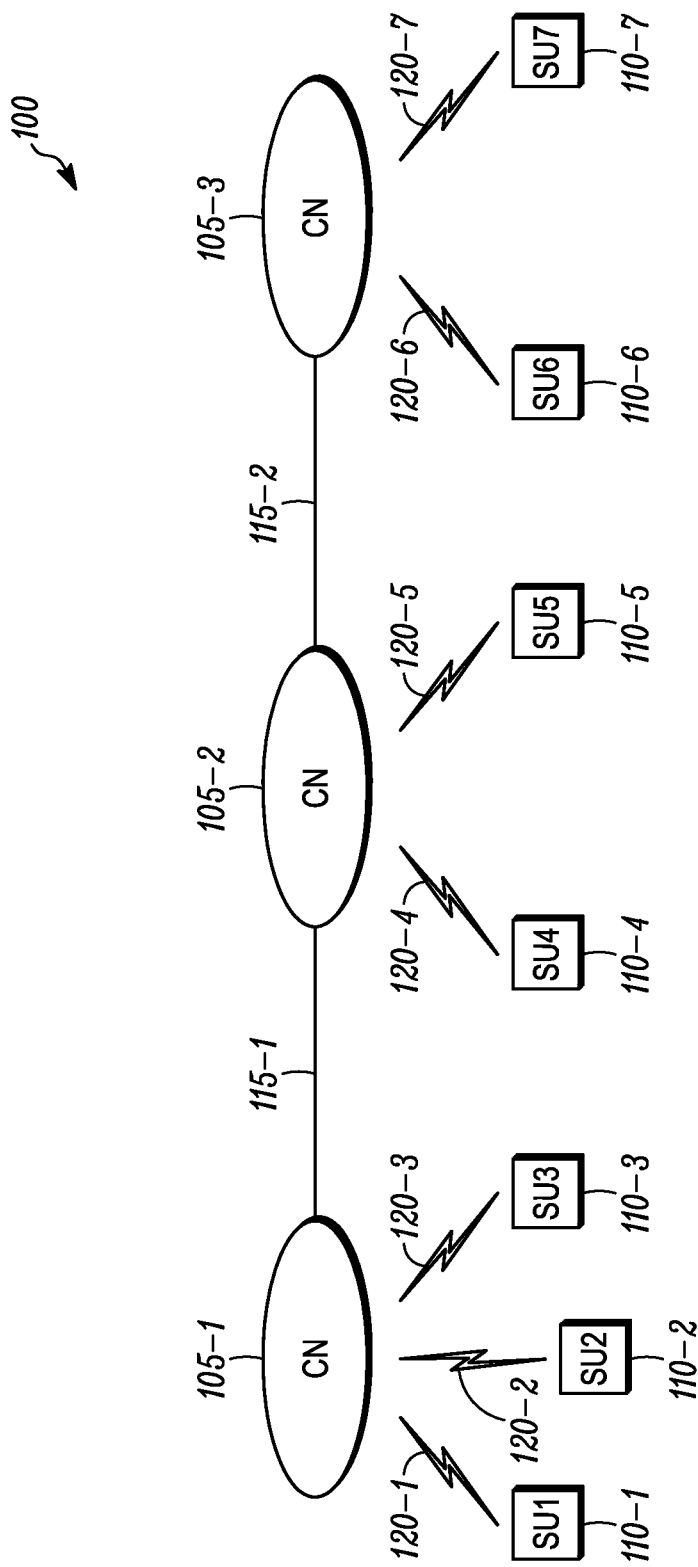
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A communication system comprises a communication node for scheduling uplink and downlink transmissions in order to reduce interference in a communication system. The communication node determines based on a first set of parameters of a data associated with the communication node and a second set of parameters of a data associated with one other communication node, whether to load the data associated with the communication node from an end of a data queue buffer. The communication node upon determining to load the data associated with the communication node from the end of the data queue buffer, loads the data associated with the communication node from the end of the data queue buffer towards start of the data queue buffer. The communication node further determines a start time for transmission of the data associated with the communication node based on an instance of the data queue buffer at which the data associated with the communication node is completely loaded onto the data queue buffer and schedules transmission of the data associated with the communication node on a frame at the start time.

FIG. 1 is a block diagram illustrating a communication system 100 employing a method of scheduling transmissions in order to reduce interference in accordance with some embodiments. The communication system 100, for example, operates using time-division duplex (TDD) technologies. In accordance with some embodiments, the communication system 100 is a multi-sector communication system where adjacent sectors have the possibility to interfere with each other. The communication system 100 includes a plurality of communication nodes 105 (shown as CN 105 in FIG. 1), for example, CN 105-1, CN 105-2, and CN 105-3. Communication nodes 105 can be, for example, base stations and/or access points that transmit signals to and receive signals from one or more subscriber units 110 (shown as SU1 through SU7 in FIG. 1) to enable the subscriber units 110 to communicate with one another as well as with other communication nodes. The communication nodes 105 communicate with each other either via wired or wireless communication links 115, for example, communication links 115-1 and 115-2. In accordance with some embodiments, the communication nodes 105 are configured to exchange parameters of their downlink data with each other. As used herein, the term "downlink data" refers to data to be transmitted by the communication nodes 105 to one or more subscriber units 110, for example subscriber units 110-1 through 110-7. A communication node 105 communicates with its associated subscriber units 110 via wireless communication links 120. Specifically, the communication node 105-1 wirelessly communicates with subscriber units 110-1 through 110-3 via wireless communication links 120-1 through 120-3, respectively; the communication node 105-2 communicates with subscriber units 110-4 through 110-5 via wireless communication links 120-4 through 120-5, respectively; and the communication node 105-3 communicates with subscriber units 110-6 through 110-7 via wireless communication links 120-6 through 120-7, respectively.

The subscriber units 110 can be, for example, one or more types of communication devices, such as mobile telephones, mobile nodes, radio terminals, and notebook computers and personal digital assistants, or the like with communication capabilities. In accordance with some embodiments, the subscriber units 110 are configured to transmit parameters of their uplink data to the communication nodes 105. As used herein, the term "uplink data" refers to data to be transmitted by the subscriber units 110 to its respective communication nodes 105. In one embodiment, the communication nodes 105 are wireless communication stations installed at a fixed location of the communication system 100.

In accordance with some embodiments, each communication node 105 is configured to schedule its transmission of downlink data (referred to herein as downlink transmission) in the communication system 100. The communication node 105 in the communication system 100 receives parameters of the downlink data associated with the co-channel or adjacent channel communication nodes and schedules its transmission based on the received parameters of the co-channel or adjacent channel communication nodes. For example, the communication node 105-2 can be configured to schedule its downlink transmission by considering parameters of the downlink data of the communication node 105-1 and the communication node 105-3. In particular, the communication node 105-2 can determine whether to load its downlink data from a start or an end of a data queue buffer based on the parameters of downlink data associated with other co-channel or adjacent channel communication nodes.

In accordance with some embodiments, each communication node 105 is further configured to schedule transmission of uplink data (referred to herein as uplink transmission) of its associated subscriber units 110. Each communication node 105 compares the parameters of uplink data of its associated subscriber units 110 to the parameters of uplink data of the subscriber units associated with other co-channel or adjacent channel communication nodes to schedule its uplink transmissions. For example, the communication node 105-2 can be configured to schedule the uplink transmissions of its associated subscriber unit 110-4 by comparing a set of parameters of uplink data of subscriber unit 110-4 to a set of parameters of uplink data of subscriber unit 110-1 associated with communication node 105-2. The communication node 105-2, as a result of comparison, can determine whether to load the uplink data of the subscriber unit 110-4 from the start or the end of the data queue buffer of communication node 105-2. The communication node 105-2, upon determination, calculates a start time for transmission of uplink data of the subscriber unit 110-4 and transmits the start time to the subscriber unit 110-4.

Figure 2:
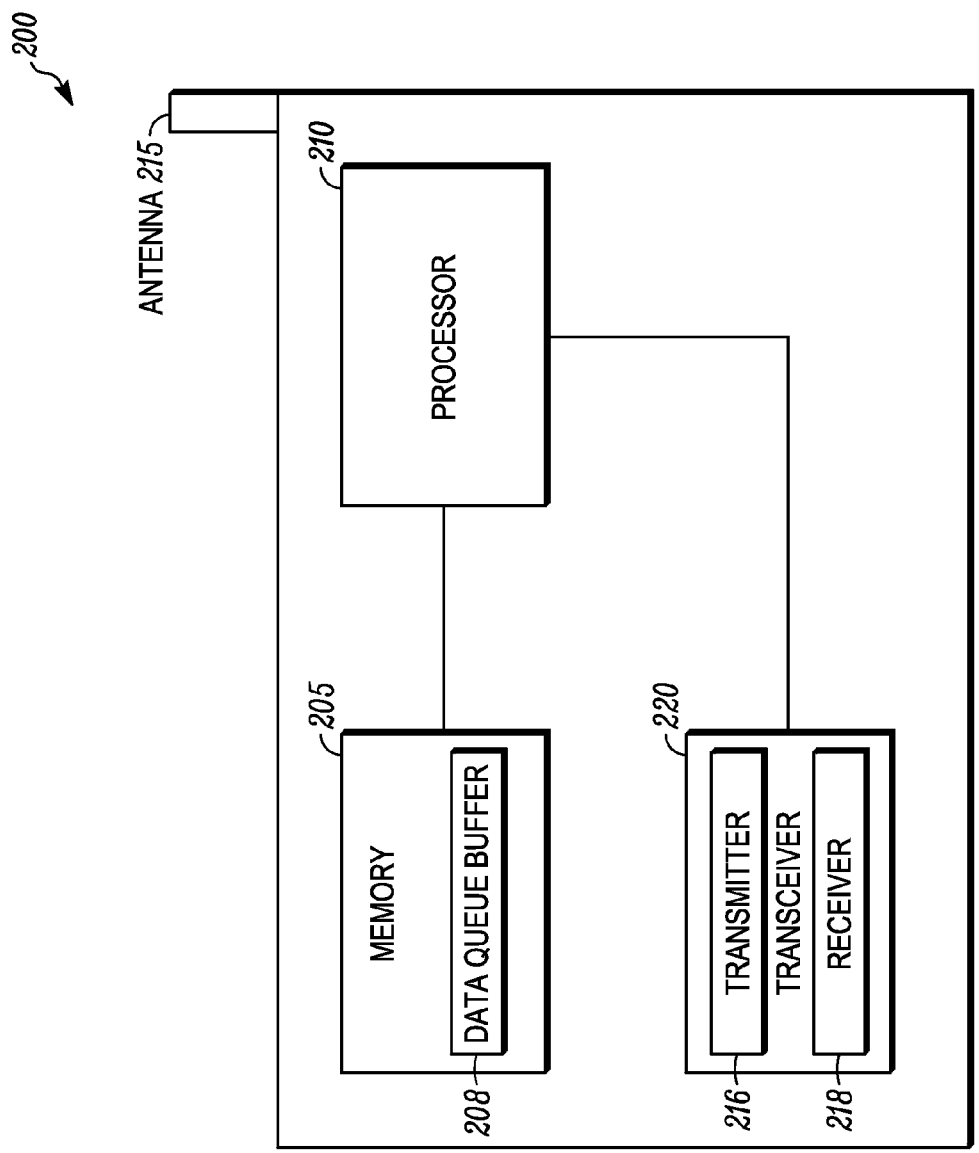
FIG. 2 is a block diagram of a portion of a communication node operating in the communication system of FIG. 1 in accordance with some embodiments.

FIG. 2 is a block diagram of at least a portion of a communication node in accordance with some embodiments. The portion 200 of the communication node may be suitable for use as any one of the communication nodes 105 of the communication system 100 shown in FIG. 1. The portion 200 of the communication node includes a memory 205, a processor 210, an antenna 215, a transceiver 220 including a transmitter circuitry 216 and a receiver circuitry 218. Although not shown, the portion 200 of the communication node also can include an antenna switch, duplexer, circulator, or other highly isolative means (not shown) for intermittently providing radio signals from the transmitter circuitry 216 to the antenna 215 and from the antenna 215 to the receiver circuitry 218. The portion 200 of the communication node is an integrated unit containing at least all the elements depicted in FIG. 2, as well as any other elements necessary for the portion 200 of the communication node to perform its particular electronic function. Alternatively, the portion 200 of the communication node can comprise a collection of appropriately interconnected units or devices, wherein such units or devices perform functions that are equivalent to the functions performed by the elements of the portion 200 of the communication node.

The processor 210 includes one or more microprocessors, microcontrollers, DSPs (digital signal processors), state machines, logic circuitry, or any other device or devices that process information based on operational or programming instructions. Such operational or programming instructions are stored in the memory 205. The memory 205 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing non-transitory digital information. One of ordinary skill in the art will recognize that when the processor 210 has one or more of its functions performed by a state machine or logic circuitry, the memory 205 containing the corresponding operational instructions can be embedded within the state machine or logic circuitry. The operations performed by the processor 210 and the other elements of the portion 200 of the communication node are described in detail below.

The transmitter circuitry 216 and the receiver circuitry 218 enable the portion 200 of the communication node to communicate radio signals to and acquire signals from the subscriber units 110. In this regard, the transmitter circuitry 216 and the receiver circuitry 218 include appropriate, conventional circuitry to enable digital or analog transmissions over a wireless communication channel. The implementations of the transmitter circuitry 216 and the receiver circuitry 218 depend on the implementation of the portion 200 of the communication node. For example, the transmitter circuitry 216 and the receiver circuitry 218 can be implemented as an appropriate wireless modem, or as conventional transmitting and receiving components of two-way wireless communication devices. In the event that the transmitter circuitry 216 and the receiver circuitry 218 are implemented as a wireless modem, the modem can be internal to the portion 200 of the communication node or insertable into the portion 200 of the communication node (e.g., embodied in a wireless radio frequency (RF) modem implemented on a Personal Computer Memory Card International Association (PCMCIA) card). For a wireless communication device, the transmitter circuitry 216 and the receiver circuitry 218 are implemented as part of the wireless device hardware and software architecture in accordance with known techniques. One of ordinary skill in the art will recognize that most, if not all, of the functions of the transmitter circuitry 216 and/or the receiver circuitry 218 can be implemented in a processor, such as the processor 210. However, the processor 210, the transmitter circuitry 216, and the receiver circuitry 218 have been artificially partitioned herein to facilitate a better understanding.

The receiver circuitry 218 is capable of receiving a request for scheduling uplink transmissions including parameters of uplink data from the associated subscriber units 110. In accordance with one embodiment, the receiver circuitry 218 is capable of receiving parameters of uplink data of the subscriber units 110 associated with other communication nodes 105 in the communication system 100. The transmitter circuitry 216 is capable of transmitting downlink data to the associated subscriber units 110 in the communication system 100. In accordance with some embodiments, the transmitter circuitry 216 is capable of transmitting the start time for transmission of the uplink data to the associated subscriber units 110. In accordance with some embodiments, the transmitter circuitry 216 is capable of transmitting parameters of its downlink and uplink data to the other communication nodes 105 in the communication system 100.

As illustrated in FIG. 2, the memory 205 stores and maintains a data queue buffer 208. The data queue buffer 208 is a region of memory 205 used to temporarily hold data while it is being moved from one place to another. Data is stored in the data queue buffer 208 just before it is sent to any other device. Data queue buffers 208 can be implemented in either hardware or software. In accordance with some embodiments, a size of the data queue buffer 208 is same as a size of a downlink data frame and uplink data frame. The downlink data frame and uplink data frame are explained in detail with reference to FIG. 3.

In accordance with one embodiment, the processor 210 compares the parameters of downlink data of each communication node 105 to the parameters of downlink data associated with the other communication nodes that transmit on the same or adjacent channel. Based on the result of comparison, the processor 210 determines to load the downlink data of the communication nodes 105 either from the start or the end of the data queue buffer 208. Upon loading the downlink data into the data queue buffer 208, the processor 210 determines an instance of the data queue buffer 208 at which the downlink data of the communication nodes 105 is completely loaded onto the data queue buffer 208. As the size of data queue buffer 208 is same as the size of downlink data frame, the instance of the data queue buffer at which the downlink data is completely loaded onto the data queue buffer 208 represents a start time of transmission of the downlink data of communication nodes 105 on the downlink data frame. The transmitter circuitry 216 then transmits the downlink data of the communication nodes 105 at the start time.

In accordance with some embodiments, the processor 210 compares the parameters of uplink data of the subscriber unit 110 associated with the communication nodes 105 to the parameters of uplink data of the subscriber units 110 associated with the other co-channel or adjacent channel communication nodes. Based on the result of comparison, the processor 210 determines to load uplink data of the subscriber unit 110 associated with the communication node 105 either from the start or the end of the data queue buffer 208. Upon loading the uplink data into the data queue buffer 208, the processor 210 determines an instance of the data queue buffer 208 at which the uplink data of the subscriber unit associated with the communication nodes 105 is completely loaded onto the data queue buffer 208. As the size of data queue buffer 208 is same as the size of uplink data frame, the instance of the data queue buffer 208 at which the uplink data is completely loaded onto the data queue buffer 208 represents a start time of transmission of the uplink data of the subscriber units 110 associated with the communication nodes 105 on the uplink data frame. The transmitter circuitry 216 then sends the start time to the subscriber unit 110 associated with the communication nodes 105 to enable the subscriber unit 110 to schedule its transmission of uplink data at the start time.

Figure 3:
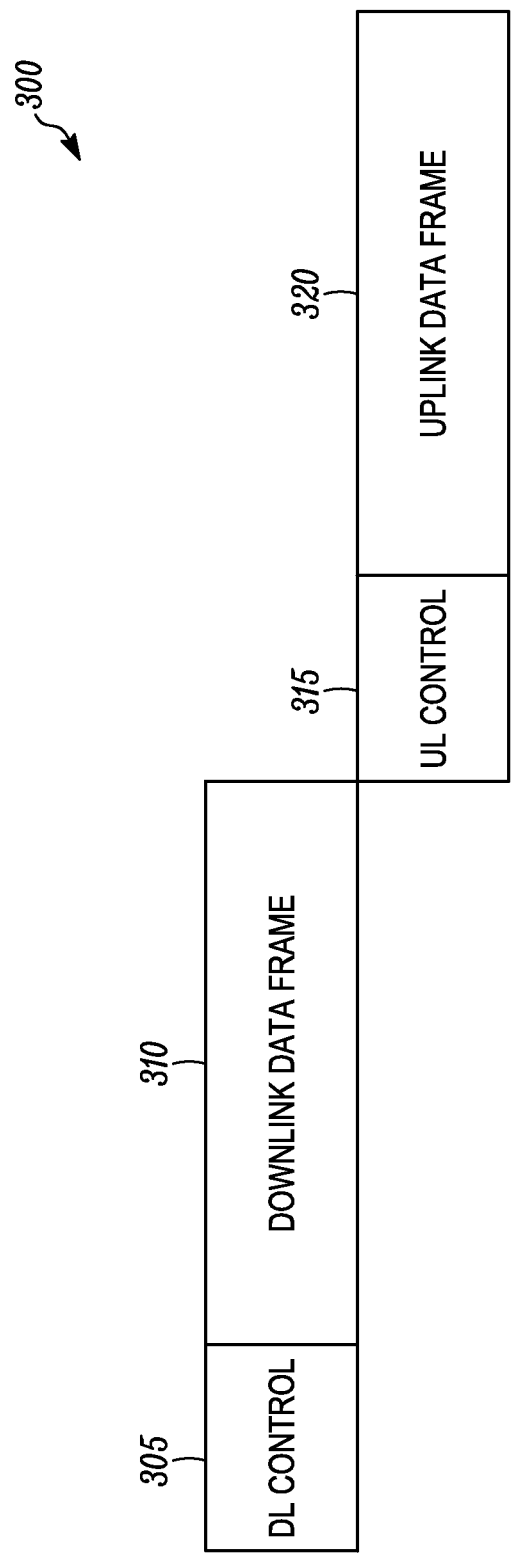
FIG. 3 illustrates an example structure of a data frame employed in the communication system of FIG. 1 in accordance with some embodiments.

FIG. 3 illustrates a structure of a data frame 300 that is used for the communications of uplink and downlink data between communication nodes 105 and subscriber units 110 in accordance with some embodiments. The format shown in FIG. 3 is used for the transmission of uplink and downlink data. The structure of the data frame 300 is divided into four (4) fields namely a downlink (DL) control 305, a downlink data frame 310, an uplink (UL) control 315, and an uplink data frame 320. The downlink data frame 310 and the uplink data frames 320 in the data frame 300 are used to carry downlink and uplink payload data respectively. For illustration purposes, consider a five (5) millisecond frame with a data packet divided into a hundred (100) microsecond slots. In one example, the slots from the $30^{th}$ slot to the $40^{th}$ slot are available for user traffic in both directions. In FIG. 3, a total of twenty four (24) slots are available for transmission of downlink data. Although the slots for uplink data are not discussed, one of ordinary skill in the art will recognize that the slots available for uplink are analogous to the downlink.

DL control 305 and UL control 315 are used for carrying coordination control messages. The transmission of coordination control messages requires a small fraction of time slots. These coordination control messages are transmitted regularly during the assigned time slots in the communication system 100. Each communication node 105 and subscriber unit 110 is configured to transmit their corresponding identification/coordination control messages during the randomly selected instance of time slots assigned for identification/coordination control messages. All other communication nodes 105 and subscriber units 110 are configured to refrain from transmitting their data (either uplink or downlink) during the time slots assigned to the identification/coordination control messages. The identification/coordination control message contains (at low modulation and coding scheme) information including, but is not limited to, a type of data to be transmitted by communication node 105 and subscriber units 110, an electronic serial number (ESN), a location and orientation of the communication nodes 105 and subscriber units 110, loading information i.e. average load of the communication nodes 105 and subscriber units 110, an estimate of experienced interference, one or more applications of the communication nodes 105 and subscriber units 110 that are either point-to-point or point to multipoint.

Each communication node 105 is provided with criteria for priority based on which each communication node 105 determines whether to load its associated data (either downlink data or uplink data) from the start or the end of the data queue buffer 208. In accordance with some embodiments, each communication node 105 is configured to determine the criteria for priority. In one example, the criterion for priority depends on the estimate of interference experienced by the communication nodes 105. Based on the selected criteria for priority, a communication node 105 determines to load its associated data (either downlink or uplink) from the start of the data queue buffer 208. The other co-channel and adjacent channel communication nodes determine to load their associated data (either downlink or uplink) from the end of the data queue buffer 208. This loading of data of two co-channel or adjacent channel communication nodes from two different ends of the data queue buffer 208 reduces the likelihood of simultaneous transmissions, making the radio frequency (RF) environment more predictable and thus making use of higher modulation and coding scheme more dependable. The reduction of likelihood of simultaneous transmission leads to lower time utilization of a channel for the same amount of traffic and thus increase the traffic capacity of the communication system 100.

Figure 4:
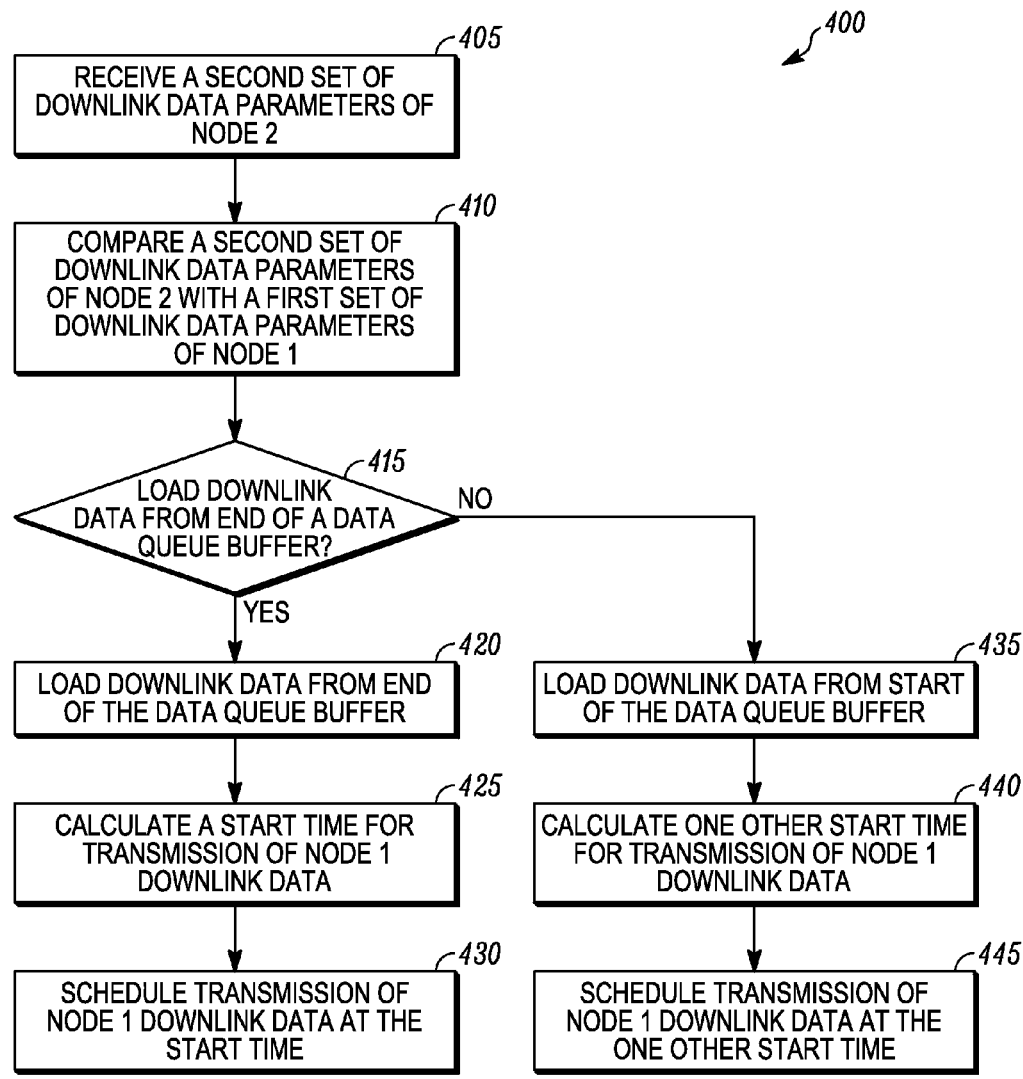
FIG. 4 is a flowchart of a method for scheduling downlink transmission by a communication node operating in the communication system of FIG. 1 in accordance with some embodiments.

FIG. 4 is a flowchart of a method 400 for scheduling downlink transmission by each communication node 105 in the communication system 100 in accordance with some embodiments. The method 400 begins with the communication nodes 105 receiving information relating to a set of parameters of a downlink data associated with any other co-channel or adjacent channel communication node at 405. For example, the communication node 105-2 receives information relating to a second set of parameters of the downlink data associated with the communication node 105-1. In accordance with some embodiments, the second set of parameters of the downlink data associated with communication node 105-1 includes, but is not limited to, information related to a type of downlink data associated with the communication node 105-1, an identifier of the communication node 105-1, a location and an orientation of the communication node 105-1, a load of the communication node 105-1 i.e. current average load of the communication node 105-1, an estimate of interference experienced by the communication node 105-1, and an application of the communication node 105-1 that are either point-to-point or point-to-multipoint.

Next, at 410, the communication node 105-2 compares the second set of parameters of the downlink data associated with the communication node 105-1 to a first set of parameters of the downlink data associated with the communication node 105-2. In accordance with some embodiments, the communication node 105-2 determines the first set of parameters of downlink data from the downlink data associated with the communication node 105-2. In accordance with some embodiments, the communication node 105-2 stores the information relating to the first set of parameters of the downlink data associated with the communication node 105-2 in the memory 205. In one example, the first set of parameters of the downlink associated with the communication node 105-2 includes, but is not limited to, information related to a type of downlink data associated with the communication node 105-2, an identifier of the communication node 105-2, a location and an orientation of the communication node 105-2, a load of the communication node 105-2 i.e. current average load of the communication node 105-2, an estimate of interference experienced by the communication node 105-2, and an application of the communication node 105-2 that are either point-to-point or point-to-multipoint.

Next, at 415, the communication node 105-2 determines whether to load the downlink data associated with the communication node 105-2 from the end of the data queue buffer 208 of the communication node 105-2. In accordance with some embodiments, the determination is made based on the result of a comparison between the first set of parameters of the downlink data associated with the communication node 105-1 and the second set of parameters of downlink data associated with the communication node 105-2. In particular, the communication node 105-2, based on the first set of parameters, determines whether the communication node 105-1 loads its downlink data from a start of the data queue buffer 208 of the communication node 105-1. In one example, when the communication node 105-2 determines that the communication node 105-1 loads the downlink data associated with the communication node 105-1 from the start of the data queue buffer 208 of the communication node 105-1, the communication node 105-2 starts loading downlink data associated with communication node 105-2 from an end of the data queue buffer 208 of the communication node 105-1. In accordance with some embodiments, such loading of downlink data of two communication nodes namely communication node 105-1 and communication node 105-2 from two different ends of the data queue buffer 208 reduces a probability of simultaneous transmissions of downlink data from the communication node 105-1 and communication node 105-2. The loading of data from two different ends further results in reducing the interference between the communication node 105-2 and communication node 105-2. In accordance with some embodiments, the 410 is performed by a server or any third party processor.

In 420, the communication node 105-2, on determining to load the downlink data associated with the communication node 105-2 from the end of the data queue buffer 208 of the communication node 105-2, loads the downlink data associated with communication node 105-2 from the end of the data queue buffer 208 of the communication node 105-2. Next, at 425, the communication node 105-2 calculates a start time for transmission of the downlink data associated with the communication node 105-2 based on an instance of the data queue buffer 208 of the communication node 105-2 at which its downlink data is completely loaded onto the data queue buffer 208 of the communication node 105-2. The communication node 105-2 then schedules the transmission of the downlink data associated with the communication node 105-2 at the start time in 430.

Returning to 415, when the communication node 105-2 determines that there is no need to load the downlink data from the end of the data queue buffer 208 of the communication node 105-2, the communication node 105-2 loads the downlink data associated with the communication node 105-2 from the start of the data queue buffer 208 of the communication node 105-2 in 435. In particular, 435 is performed by the communication node 105-2 upon determining that the communication node 105-1 loads the downlink data associated with communication node 105-1 from the of the data queue buffer 208 of the communication node 105-1. In accordance to some embodiments, 435 is performed in response to determining that the communication node 105-1 does not have any downlink data to load onto the data queue buffer 208 of the communication node 105-1. At 440, the communication node 105-2 calculates one other start time for transmission of the downlink data associated with communication node 105-2. In this case, the one other start time is a time at which transmission of the downlink data associated with communication node 105-2 begins on a downlink data frame 310. Next, at 445, the communication node 105-2 schedules the transmission of the downlink data associated with the communication node 105-2 at the one other start time.

Figure 5:
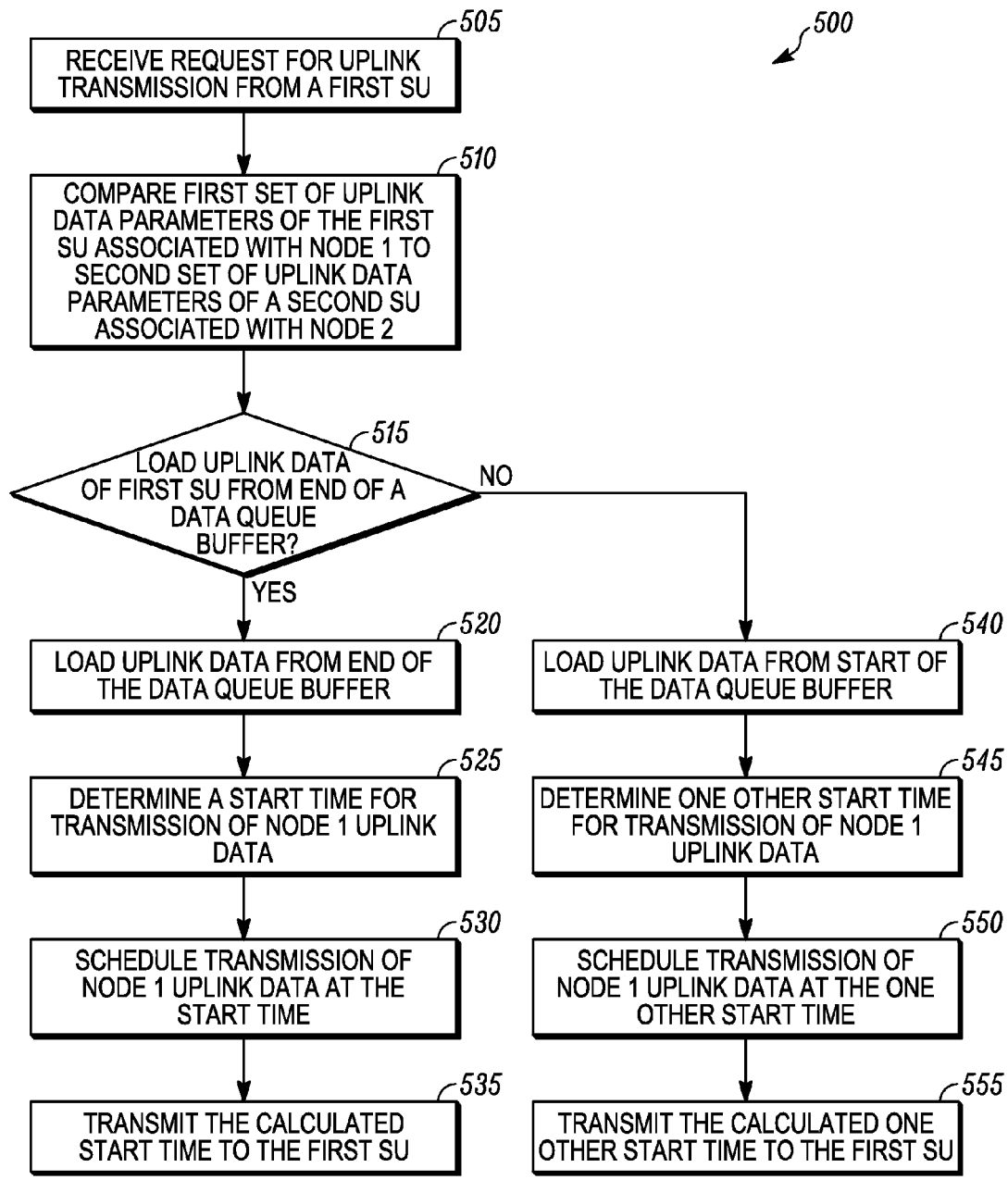
FIG. 5 is a flowchart of a method for scheduling uplink transmission by a communication node operating in the communication system of FIG. 1 in accordance with some embodiments.

FIG. 5 is a flowchart of a method 500 for scheduling uplink transmission by the subscriber unit 110-4 associated with the communication node 105-2 in the communication system 100 in accordance with some embodiments. The method 500 begins at 505 with the communication node 105-2 receiving a request message for scheduling uplink transmissions from the subscriber unit 110-4. The request message includes information relating to a second set of parameters of an uplink data associated with subscriber unit 110-4 operating under the communication node 105-2. In accordance with some embodiments, the second set of parameters of the uplink data associated with the subscriber unit 110-4 includes, but is not limited to, information related to a type of uplink data associated with the subscriber unit 110-4, an identifier of the subscriber unit 110-4, a location and an orientation of the subscriber unit 110-4, a load of the subscriber unit 110-4 i.e. current average load of the subscriber unit 110-4, an estimate of interference experienced by the subscriber unit 110-4, and an application of the subscriber unit 110-4 i.e. point-to-point or point-to-multipoint.

Next, at 510, the communication node 105-2 compares the second set of parameters of the uplink data of the subscriber unit 110-4 associated with the communication node 105-2 to a first set of parameters of an uplink data of the subscriber unit 110-1 associated with the communication node 105-1. In one example, the communication node 105-2 receives the first set of parameters of the uplink data of the subscriber unit 110-1 associated with the communication node 105-1 from the communication node 105-1 directly or via some intermediate entity. In accordance with some embodiments, the first set of parameters of the uplink data associated with the subscriber unit 110-1 includes, but is not limited to, information related to a type of uplink data associated with the subscriber unit 110-1, an identifier of the subscriber unit 110-1, a location and an orientation of the subscriber unit 110-1, a load of the subscriber unit 110-1 i.e. current average load of the subscriber unit 110, an estimate of interference experienced by the subscriber unit 110-1, and an application of the subscriber unit 110-1 i.e. point-to-point or point-to-multipoint.

Next, at 515, the communication node 105-2 determines whether to load the uplink data of the subscriber unit 110-4 associated with communication node 105-2 from the end of the data queue buffer 208 of the communication node 105-2. This determination is made based on the result of comparison between the first set of parameters of uplink data of the subscriber unit 110-1 associated with the communication node 105-1 and second set of parameters of uplink data of the subscriber unit 110-4 associated with the communication node 105-2. In other words, the communication node 105-2, determines whether the communication node 105-1 loads the uplink data of the subscriber unit 110-1 from the start of the data queue buffer 208 of the communication node 105-1. In case, when the communication node 105-1 loads the uplink data of the subscriber unit 110-1 from the start of the data queue buffer 208 of the communication node 105-1, the communication node 105-2 determines to load the uplink data of subscriber unit 110-4 from the end of the data queue buffer 208 of the communication node 105-2 so that a probability of simultaneous transmissions from the subscriber unit 110-1 and the subscriber unit 110-4 is reduced. This loading of uplink data of two subscriber units namely subscriber unit 110-1 and 110-4 results in reducing the interference between the subscriber unit 110-1 and subscriber unit 110-4. In accordance with some embodiments, the 515 is performed by a server or any third party processor.

In 520, the communication node 105-2, on determining to load the uplink data of the subscriber unit 110-4 from the end of the data queue buffer 208 of the communication node 105-2, loads the uplink data of the subscriber unit 110-4 from the end of the data queue buffer 208 of communication node 105-2. Next, at 525, the communication node 105-2 calculates a start time for transmission of the uplink data of the subscriber unit 110-4 based on an instance of the data queue buffer 208 of communication node 105-2 at which the uplink data of the subscriber unit 110-4 is completely loaded onto the data queue buffer 208 of the communication node 105-2. The communication node 105-2 then schedules the transmission of the uplink data of the subscriber unit 110-4 at the start time in 530. Next, at 535, the communication node 105-2 transmits the start time to the subscriber unit 110-4.

Returning to 515, if the communication node 105-2 determines that there is no need to load the uplink data of the subscriber unit 110-4 from the end of the data queue buffer 208 of the communication node 105-2, then the communication node 105-2 will start loading the uplink data of the subscriber unit 110-4 from the start of the data queue buffer 208 of the communication node 105-2 in 540. In other words, 540 is performed by the communication node 105-2 upon determining that the communication node 105-1 loads the uplink data of the subscriber unit 110-1 from the end of the data queue buffer 208 of communication node 105-1. At 545, the communication node 105-2 calculates one other start time for transmission of the uplink data of the subscriber unit 110-4. In this case, the one other start time is a time at which transmission of uplink data begins on the uplink data frame 320. Next, at 550, the communication node 105-2 schedules the transmission of uplink data of the subscriber unit 110-4 at the one other start time. The communication node then sends information regarding the one other start time to the subscriber unit 110-4 at 555.

Figure 6:
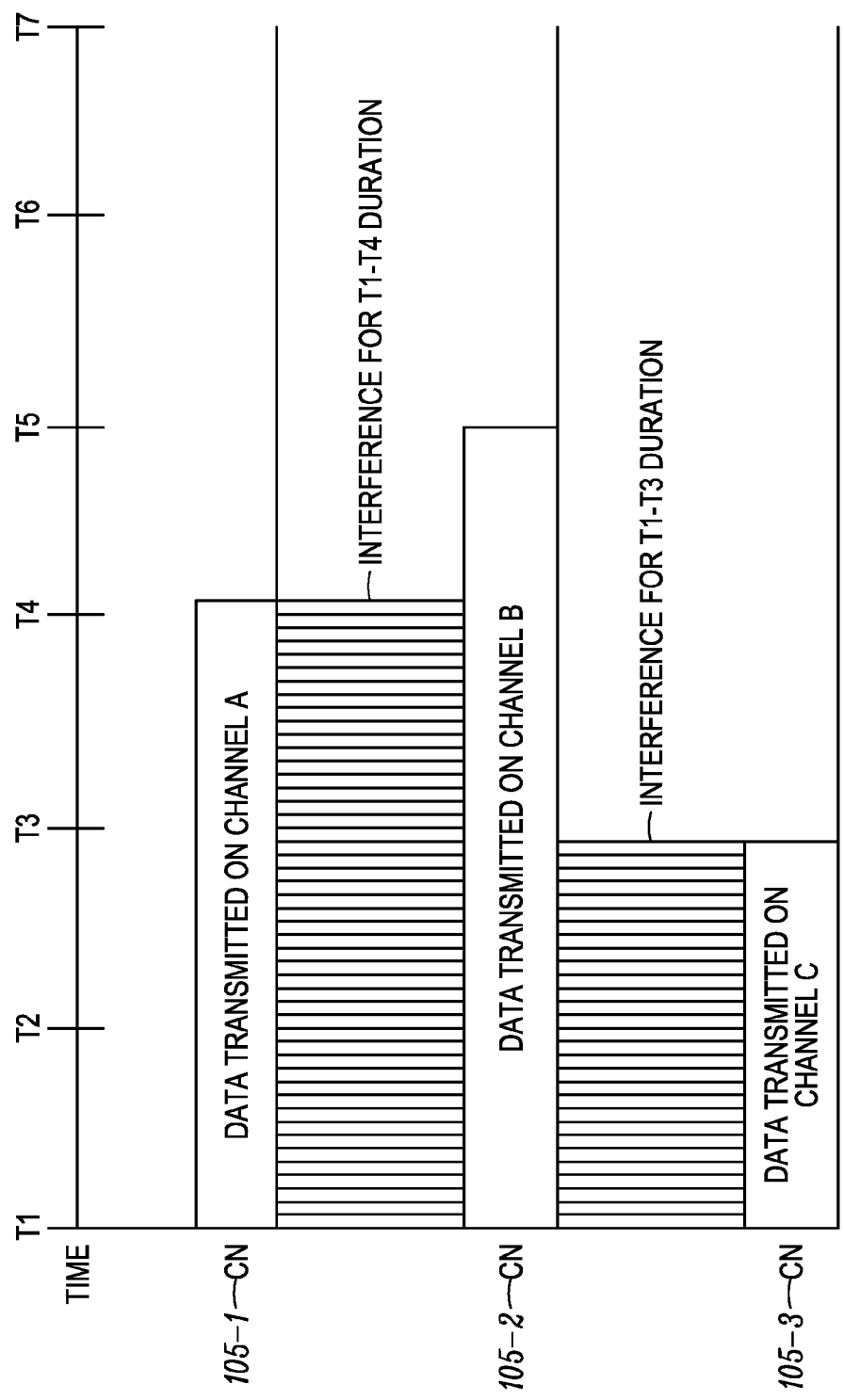
FIG. 6 is a graphic illustration of interference occurring between communication nodes during transmission in a communication system.
Figure 7:
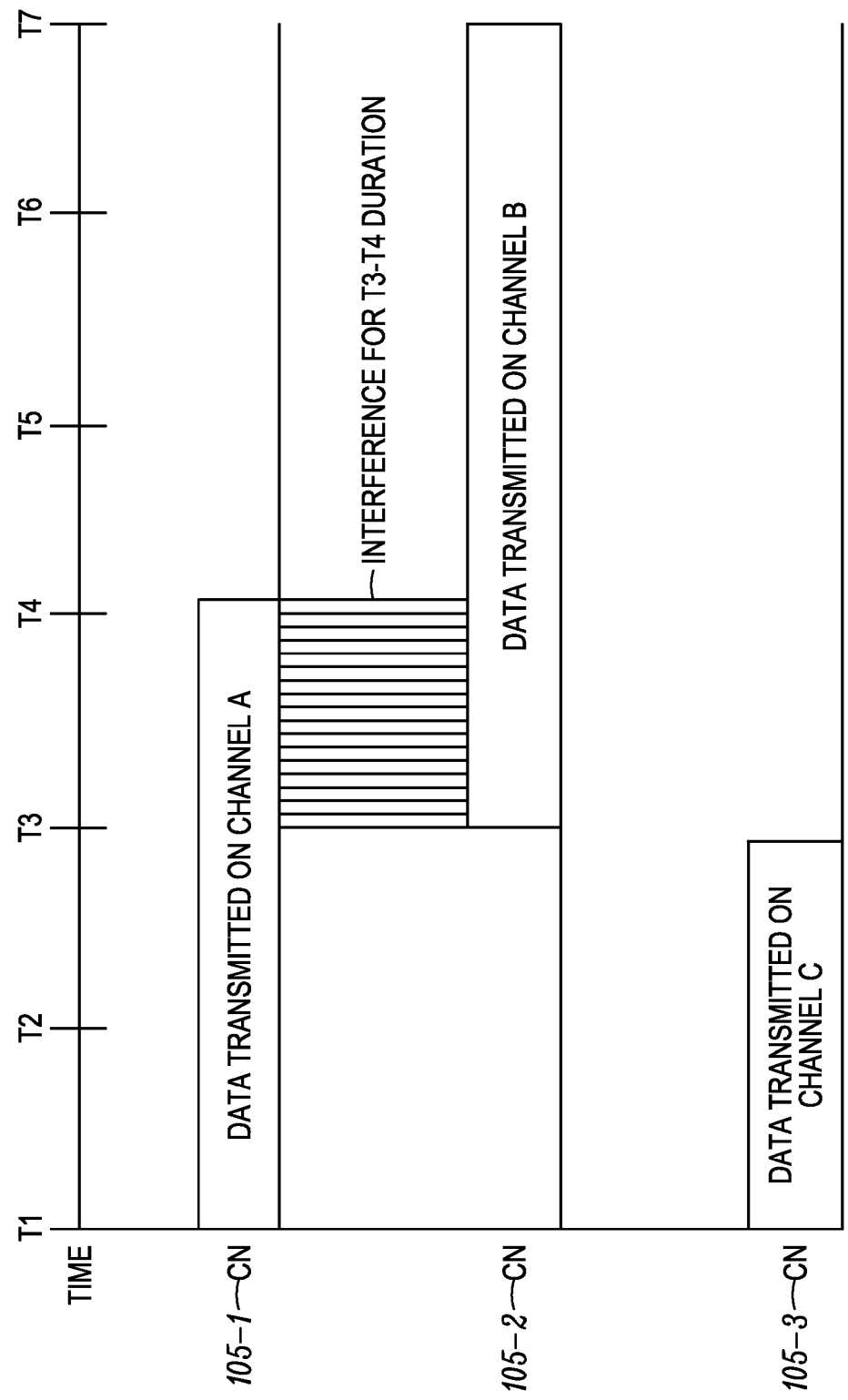
FIG. 7 is a graphic illustration of interference occurring between communication nodes during transmission in the communication system of FIG. 1 in accordance with some embodiments.

FIGS. 6 and 7 show graphic illustrations of interference between transmissions from two communication nodes namely communication node 105-1 and communication node 105-2. The communication node 105-1 and communication node 105-2 transmit data on the same channel or adjacent channels. Assume that at some particular instance of time, the communication node 105-1 has downlink data to transmit which is of T4 time duration and the communication node 105-2 has downlink data to transmit which is of T5 time duration. In communication systems, as shown in FIG. 6, when both the communication node 105-1 and communication node 105-2 schedule their transmissions from the start of a downlink data frame 310, an overlap occurs for duration of T1-T4 time duration. This overlapping results in interference between data from the communication node 105-1 and the communication node 105-2, thus forcing the two communication nodes namely communication node 105-1 and communication node 105-2 to reduce the traffic data rate carried by the channel.

In the example shown in FIG. 6, the traffic carried is half data rate for three (3) slots for the communication node 105-1, half data rate for three (3) slots for the communication node 105-2, full data rate for one (1) slot for communication node 105-2, altogether four (4) slots at full rate. In accordance with some embodiments, it is possible to reduce the interference by scheduling the downlink transmissions of the two communication nodes 105 at two different start times as explained with reference to FIG. 4. In FIG. 7, the communication node 105-2, on comparing the first set of parameters of the downlink data associated with the communication node 105-1 to the second set of parameters of the downlink data associated with the communication node 105-2, determines to load the downlink data associated with communication node 105-2 from the end of the data queue buffer 208 of the communication node 105-2. Based on the instance at which the downlink data of the communication node 105-2 is completely loaded onto the data queue buffer 208 of the communication node 105-2, the communication node 105-2 calculates a start time for the transmission of the downlink data of the communication node 105-2. Using different start time for transmission of downlink data of communication node 105-2 reduces the period of simultaneous transmissions of downlink data of communication node 105-1 and communication node 105-2 which in turn reduces the period of interference. In this example, the time interval for which the interference takes place between the communication node 105-1 and the communication node 105-2 is reduced to only one time slots (i.e.

T3-T4 duration). In accordance with the example as shown in FIG. 7, the traffic carried is full data rate for two (2) slots for the communication node 105-1 and full data rate for three (3) slots for the communication node 105-2, plus half data rate for each communication node 105-1 and 105-2 for one (1) slot, altogether six (6) slots at full data rate. In accordance with some embodiments, using two different transmission times for transmission of downlink data of two different communication nodes maximizes the likelihood of transmission of downlink data of one communication node while the other communication node is idle. Similarly, the communication nodes 105 schedule the transmission of the uplink data of their associated subscriber units 110 at different transmission times, so that the period of simultaneous transmission of the uplink data of subscriber unit 110-1 associated with the communication node 105-1 and the uplink data of subscriber unit 110-4 associated with the communication node 105-2 is reduced.

In accordance with one embodiment, the communication system 100 can be operatively utilized in any communication system that is less than fifty (50) percent loaded by loading data of a first communication node from a start of a data queue buffer and data of a second communication node from an end of the data queue buffer. In communication systems that are less than fifty (50) percent loaded, loading the data of the two communication nodes from two different ends separate the data of two communication nodes in time and thus reduces the probability of interference to zero. Embodiments described above can also be employed in communication systems with load more than fifty (50) percent. In communication systems that are more than fifty (50) percent loaded, loading the data of the two communication nodes from two different ends shorten the period of simultaneous transmission of the data of two communication nodes and thus reduce the potential for interference.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for scheduling downlink transmissions in a communication system, the method comprising:

determining, by a communication node, based on a comparison of a first set of parameters of downlink data associated with the communication node and a second set of parameters of downlink data associated with one other communication node, whether to load the downlink data associated with the communication node from an end of a data queue buffer;
loading, by the communication node, the downlink data associated with the communication node from the end of the data queue buffer towards a start of the data queue buffer, upon determining to load the downlink data associated with the communication node from the end of the data queue buffer;
determining, by the communication node, a start time for transmission of the downlink data associated with the communication node based on an instance of the data queue buffer at which the downlink data associated with the communication node is completely loaded onto the data queue buffer; and
scheduling, by the communication node, transmission of the downlink data associated with the communication node on a downlink frame at the start time.

2. The method as claimed in claim 1, further comprising:
loading, by the communication node, the downlink data associated with the communication node from the start of the data queue buffer towards end of the data queue buffer, upon determining not to load the downlink data associated with the communication node from the end of the data queue buffer;
determining, by the communication node, one other start time for transmission of the downlink data associated with the communication node; and
scheduling transmission of the downlink data associated with the communication node on the downlink frame at the one other start time.

3. The method as claimed in claim 2, wherein the one other start time is a time at which transmission of the downlink data begins on the downlink frame.

4. The method as claimed in claim 1, further comprising transmitting, by the communication node and the one other communication node, on two different communication channels.

5. The method as claimed in claim 1, wherein the first set of parameters of the downlink data associated with the communication node includes information related to at least one of:
a type of downlink data from communication node; an identifier of the communication node;
a location and an orientation of the communication node;
a load of the communication node;
an estimate of interference experienced by the communication node; and
an application of the communication node.

6. The method as claimed in claim 1, wherein the second set of parameters of the downlink data associated with the one other communication node includes information related to at least one of:
a type of downlink data from the one other communication node;
an identifier of the one other communication node;
a location and an orientation of the one other communication node;
a load of the one other communication node;
an estimate of interference experienced by the one other communication node; and
an application of the one other communication node.

7. The method as claimed in claim 1, further comprising transmitting, by the communication node and the one other communication node, on a same communication channel.

8. A method for scheduling uplink transmissions in a communication system comprises:

receiving, by a communication node, a request for scheduling uplink transmissions from a first subscriber unit;
determining, by the communication node, based on a comparison of a first set of parameters of uplink data of the first subscriber unit associated with the communication node and a second set of parameters of uplink data of a second subscriber unit associated with one other communication node, whether to load the uplink data of the first subscriber unit associated with the communication node from an end of a data queue buffer;
loading, by the communication node, the uplink data of the first subscriber unit associated with the communication node from the end of the data queue buffer towards start of the data queue buffer, upon determining to load the uplink data of the first subscriber unit associated with the communication node from the end of the data queue buffer;
determining, by the communication node, a start time for transmission of the uplink data of the first subscriber unit associated with the communication node based on an instance of the data queue buffer at which the uplink data of the first subscriber unit associated with the communication node is completely loaded onto the data queue buffer;
scheduling, by the communication node, transmission of the uplink data of the first subscriber unit associated with the communication node on an uplink frame at the start time; and
sending, by the communication node, a message including information regarding the start time for transmission of the uplink data to the subscriber unit.

9. The method as claimed in claim 8, further comprising transmitting, by the communication node and the one other communication node, on a same communication channel or two different communication channels.

10. The method as claimed in claim 9, further comprising:
loading, by the communication node, the uplink data of the first subscriber unit associated with the communication node from the start of the data queue buffer towards end of the data queue buffer, upon determining not to load the uplink data of the first subscriber unit associated with the communication node from the end of the data queue buffer;
determining, by the communication node, one other start time for transmission of the uplink data of the first subscriber unit associated with the communication node; and
scheduling transmission of the uplink data of the first subscriber unit associated with the communication node on the uplink frame at the one other start time.

11. The method as claimed in claim 10, wherein the one other start time is a time at which transmission of the uplink data begins on the uplink frame.

12. A communication node for scheduling uplink transmissions in a communication system comprises:
a transceiver configured to receive a request for scheduling uplink transmissions from a first subscriber unit; and
a processor communicatively coupled to the transceiver, the processor configured to:
determine based on a comparison of a first set of parameters of uplink data of the first subscriber unit associated with the communication node and a second set of parameters of uplink data of a second subscriber unit associated with one other communication node, whether to load the uplink data of the first subscriber unit associated with the communication node from an end of a data queue buffer, load the uplink data of the first subscriber unit associated with the communication node from the end of the data queue buffer towards start of the data queue buffer, upon determining to load the uplink data of the first subscriber unit associated with the communication node from the end of the data queue buffer, determine a start time for transmission of the uplink data of the first subscriber unit associated with the communication node based on an instance of the data queue buffer at which the uplink data of the first subscriber unit associated with the communication node is completely loaded onto the data queue buffer, schedule transmission of the uplink data of the first subscriber unit associated with the communication node on an uplink frame at the start time, and wherein the transceiver sends the information regarding the start time for transmission of the uplink data to the first subscriber unit.

13. The communication node as claimed in claim 12, wherein the processor is further configured to:

load the uplink data of the first subscriber unit associated with the communication node from the start of the data queue buffer towards end of the data queue buffer, upon determining not to load the uplink data associated with the communication node from the end of the data queue buffer, determine one other start time for transmission of the uplink data of the first subscriber unit associated with the communication node, wherein the one other start time is a time at which transmission of the uplink data begins on the uplink frame, and schedule transmission of the uplink data of the first subscriber unit associated with the communication node on the uplink frame at the one other start time.

14. A communication node for scheduling downlink transmissions in a communication system comprises:

a transceiver; and a processor communicatively coupled to the transceiver, the processor configured to:

determine based on a comparison of a first set of parameters of downlink data associated with the communication node and a second set of parameters of downlink data associated with one other communication node, whether to load the downlink data associated with the communication node from an end of a data queue buffer, load the downlink data associated with the communication node from the end of the data queue buffer towards start of the data queue buffer, upon determining to load the downlink data associated with the communication node from the end of the data queue buffer, determine start time for transmission of the downlink data associated with the communication node based on an instance of the data queue buffer at which the downlink data associated with the communication node is completely loaded onto the data queue buffer, and schedule transmission of the downlink data associated with the communication node on a downlink frame at the start time.

15. The communication node as claimed in claim 14, wherein the processor is further configured to:

load the downlink data associated with the communication node from the start of the data queue buffer towards end of the data queue buffer, upon determining not to load the downlink data associated with the communication node from the end of the data queue buffer, determine one other start time for transmission of the downlink data associated with the communication node wherein the one other start time is a time at which transmission of the downlink data begins on the downlink frame, and schedule transmission of the downlink data associated with the communication node on the downlink frame at the one other start time.

16. A communication node for scheduling communications in a communication system, the communication node comprising:

a transceiver; and a processor communicatively coupled to the transceiver, the processor configured to:

determine based on a comparison of a first set of parameters of data associated with the communication node and a second set of parameters of data associated with one other communication node, whether to load the data associated with the communication node from an end of a data queue buffer, load the data associated with the communication node from the end of the data queue buffer towards start of the data queue buffer, upon determining to load the data associated with the communication node from the end of the data queue buffer, determine a start time for transmission of the data associated with the communication node based on an instance of the data queue buffer at which the downlink data associated with the communication node is completely loaded onto the data queue buffer, and schedule transmission of the data associated with the communication node on a data frame at the start time; load the data associated with the communication node from the start of the data queue buffer towards end of the data queue buffer, upon determining not to load the data associated with the communication node from the end of the data queue buffer, determine one other start time for transmission of the data associated with the communication node wherein the one other start time is a time at which transmission of the data begins on the data frame, and schedule transmission of the data associated with the communication node on the data flame at the one other start time.

17. The communication node as claimed in claim 16, wherein the transceiver is further configured to receive a request for scheduling communication from a first subscriber unit associated with the communication node and transmit a message including information regarding the start time for transmission of the data to the first subscriber unit, wherein the communication is an uplink communication.

* * * * *